Patented Nov. 14, 1922.

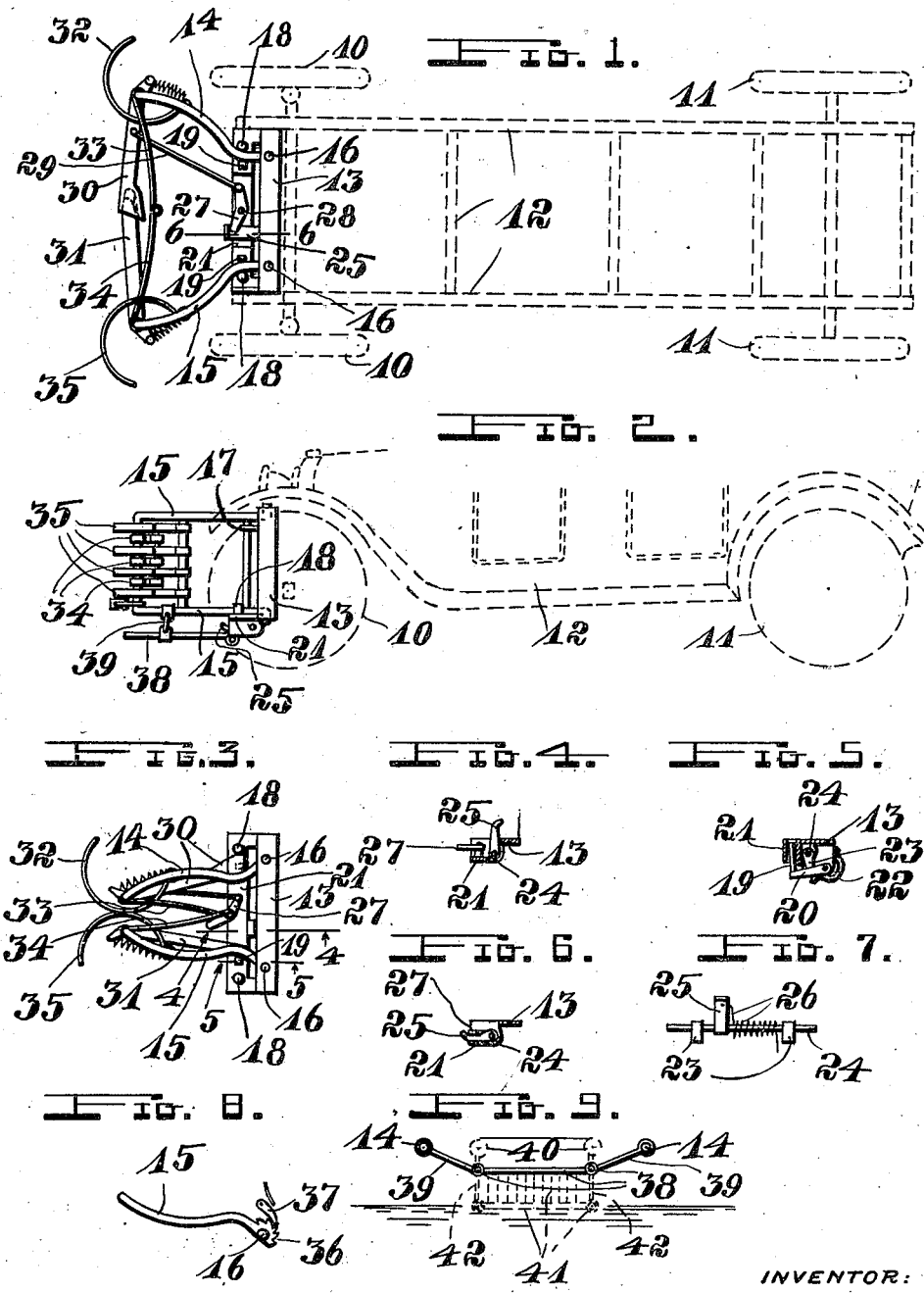

1,435,383

UNITED STATES PATENT OFFICE.

CHARLES W. ERVIN, OF LOS ANGELES, CALIFORNIA.

AUTOMOBILE FENDER.

Application filed September 2, 1921. Serial No. 497,825.

*To all whom it may concern:*

Be it known that I, CHARLES W. ERVIN, a citizen of the United States, residing at Los Angeles, in the county of Los Angeles and State of California, have invented a new and useful Automobile Fender, of which the following is a specification.

This invention relates to devices placed on the front end of automobiles to prevent accidents.

One of the objects of this invention is to provide a device which will catch a pedestrian in the position which the pedestrian occupied when the automobile struck or hit him.

Another object is to provide a device which will catch and hold a pedestrian in the position in which the automobile approached and struck the pedestrian, so as to make it impossible that the automobile can run or pass over the pedestrian.

Another object is to provide a device which will close and engage around a pedestrian by arm-like members, swingably mounted in a practically horizontal plane, so as to normally engage over the sides of a pedestrian and in a position to hold the pedestrian in this position supported above the ground.

Other objects will appear from the following description and appended claims as well as from the accompanying drawing, in which—

Fig. 1 is a top plan view of the device, wheels and chassis of an automobile being indicated in dotted lines to illustrate the relative position of the device to an automobile.

Fig. 2 is a side elevation of the device with a fragmentary illustration in dotted lines of an automobile to show the relative position of the device to the automobile.

Fig. 3 is a top plan view of the device in nearly closed position.

Fig. 4 is a cross section through the locking mechanism on line 4—4 of Fig. 3.

Fig. 5 is a cross section through the locking mechanism on line 5—5 of Fig. 3.

Fig. 6 is a cross section through the locking mechanism on line 6—6 of Fig. 1.

Fig. 7 is a top plan view of the locking and engaging shaft for holding the whole mechanism in catching and receiving position.

Fig. 8 is a detail top plan view of one of the supporting arms, illustrating the locking of the arm in closed position.

Fig. 9 is a detail front elevation of a lower supporting fender to illustrate the dropping of the fender when the supporting arms close in on a pedestrian.

With front fenders of this type it is important that the device be provided with means for holding a pedestrian in a supporting manner as well as for holding the pedestrian against falling from the device after being caught, since a pedestrian is liable to be stunned or in a fainting condition, not able to support or hold himself to the fender. Fenders can only be built or made of a limited size to not project too far from the front of automobiles or street cars or other vehicles, since they would otherwise endanger more than serve the pedestrians. Being of such limited size, a pedestrian is liable to be thrown from the fender after being caught, especially if the pedestrian is stunned or in a fainting condition.

The main principle of this invention is therefore to provide a device which will immediately take hold of a pedestrian on striking or hitting so that the pedestrian will be firmly held by the device.

In Fig. 1, 10 designates the front wheels of an automobile, 11 the rear wheels, and 12 the chassis. It might therefore appear that the device is only to be used on automobiles, but it will easily be understood that the device may be used on street cars and other similar vehicles as well, and that following description and the principles disclosed by the description, claims, and drawing should mainly be considered regardless of the vehicle on which the device is being used.

A frame 13 is provided and designed to be mounted on the front end of a vehicle. The main supporting arms 14 and 15 are pivotally engaged at 16 with the frame 13. The arms 14 and 15 are preferably spring-controlled, the end of a spring being indicated at 17 in Fig. 2, so that the arms are normally under the tension of such springs, to be thrown or swung together, or towards one another, on being released, to the position illustrated in Fig. 3.

The Fig. 1 illustrates the whole device in a position ready to catch a pedestrian on striking.

The Fig. 3 illustrates the position to which the whole mechanism moves after striking a pedestrian, so that it will be clear over the illustration in Fig. 1 that the whole mechanism automatically moves from the catching to the holding and supporting position, as will be more clearly described hereafter.

Several detail parts serve to hold the whole device in the catching position as illustrated in Fig. 1. Lugs 18 serve to hold the arms 14 and 15 against movement beyond their catching position in which they are illustrated in Fig. 1. Other lugs 19 are provided on the levers 20 to project through the portions 21 of the frame 13 into the path of the arms 14 and 15 to prevent the arms from collapsing before the proper time. The arms or levers 20 are spring-controlled as indicated at 22 in Fig. 5. By the action and tension of the springs 22, the levers 20 are normally held in their uppermost positions to bring the upper ends of the lugs 19 into the path of the swinging arms 14 and 15, as indicated and illustrated in Fig. 1.

The levers 20 are moved out of such interfering or locking position by the cams 23, see Figs. 5 and 7. The cams 23 are mounted on a common shaft 24 with the locking lever 25. A spring 26 serves to automatically move the shaft and thereby the locking lever and the cams from the set or locking position.

Another lever 27 is pivotally mounted at 28 on the front portion 21 of the frame. The lever 27 connects with the operating braces, or at least to one of them, through the rod 29. The brace 30 is provided with a socket in the front end so that the brace 31 can engage within this socket for holding the arms 14 and 15 spaced as illustrated in Fig. 1. These braces 30 and 31 are in a position to hit a pedestrian first. On hitting a pedestrian, the braces fold easily against the arms 14 and 15 as illustrated in Fig. 3. On folding or moving towards the arms 14 and 15, the rod 29 is pushed against the lever 27. The moving of the lever 27 around its pivot at 28 causes the lever 27 to disengage from the lever 25. A releasing of the lever 25 allows the spring 26 to turn the shaft 24 with the lever 25 and the cams 23, thereby causing the cams to turn to the position illustrated in Fig. 5. The actions of the cams on the levers 20 cause a withdrawal of the lugs 19 in front of the arms 14 and 15. The arms 14 and 15 are in this manner released and free to swing centrally to the position in which they are illustrated in Fig. 3.

The cushioning members 32, 33, 34 and 35 are provided on the arms 14 and 15 to reduce the striking effect when the arms engage around a pedestrian and at the same time tend to avoid injury.

At the base of the arms, near their pivot connection, locking means are preferably provided to firmly lock the arms when engaged around a pedestrian. A portion of a ratchet wheel is illustrated on the arm 15 in Fig. 8, and pawl 37 is provided to engage with the ratchet 36. After the arms 14 and 15 swing centrally, they are prevented from opening again until released from the pawls.

To the front portion 21 of the frame is also preferably attached a fender 38. This fender is provided to eventually support the feet of a pedestrian when caught in the device. In the illustration of Fig. 2, the fender can be seen in a lifted position in relation to the device. The illustration in Fig. 9 is a front elevation of this portion of the fender. The arms 14 and 15 are normally in the position in which they are illustrated in Fig. 9, so that the rods 39 project centrally to connect the fender portion 38 with the arms 14 and 15. On swinging centrally or towards each other, the arms move to a position practically above the fender portion 38 so that the rods hang down to such an extent that the front end of the fender portion 38 drops below its normal position. The position most favorable for such a dropping of the lower fender portion is indicated in dotted lines, 40 indicating the position of the arms 14 and 15, 41 indicating the position of the front end of the fender portion 38, and 42 indicating the position of the hanging rods.

Having thus described my invention, I claim:

1. In an automobile fender, a frame having means to engage with the front end of an automobile, arm-like members pivotally engaged to the frame at a point near the front wheels of the automobile and projecting in a slanting direction forwardly in front of the automobile wheels, contact-members pivotally engaged to the free ends of the arm-like members and projecting across the front of the automobile for holding the arm-like members in spaced relation to one another, the contact members terminating in engaging means for holding the members across the front of the automobile and adapted to disengage on hitting a pedestrian, and means for moving the arm-like members towards each other when a pedestrian hits the device.

2. In an automobile fender, a frame having means to engage with the front end of an automobile between the front wheels, arm-like members pivotally engaged to the frame projecting in a slanting direction forwardly in front of the automobile wheels, contact braces pivotally engaged to the free ends of the arm-like members projecting towards one another and across the front of the automobile for holding the arm-like members spaced, the contact braces terminating in engaging means for holding the braces across the front of the automobile and adapted to disengage when hit by a pedestrian, springs for moving the arm-like members towards each other, locking means for holding the arm-like members in spaced position and in folded position, and means actuated by the contact braces for disengaging the locking means of the arm-like members when a pedestrian hits the braces.

In testimony that I claim the foregoing as my invention I have signed my name in the presence of two subscribing witnesses.

CHARLES W. ERVIN.

Witnesses:
O. H. KRUEGER,
JESSIE A. MANOCK.